United States Patent [19]
Brigman et al.

[11] 4,365,924
[45] Dec. 28, 1982

[54] DISABLED PERSON TRANSFER DEVICE

[75] Inventors: Maurice C. Brigman, 616 S. West St., Royal Oak, Mich. 48067; Edward C. Sikes, Springville, Tenn.

[73] Assignee: Maurice C. Brigman, Royal Oak, Mich.

[21] Appl. No.: 174,520

[22] Filed: Aug. 1, 1980

[51] Int. Cl.³ .......................... B60P 1/48; B60N 1/02
[52] U.S. Cl. .......................... 414/549; 280/289 WC; 414/921
[58] Field of Search .............. 414/462, 546, 549, 921; 280/289 WC

[56] References Cited

U.S. PATENT DOCUMENTS

| | | | |
|---|---|---|---|
| 3,677,424 | 7/1972 | Anderson | 414/921 X |
| 4,170,368 | 10/1979 | Southward et al. | 414/921 X |
| 4,278,387 | 7/1981 | Seguela et al. | 414/921 X |

*Primary Examiner*—Robert G. Sheridan
*Attorney, Agent, or Firm*—Basile, Weintraub & Hanlon

[57] ABSTRACT

A device for transferring a disabled person from a wheelchair to a vehicle. The device of the present invention comprises a removable seat associated with the wheelchair and an actuator attached to a door of the vehicle. The actuator is adapted to releasably engage the seat to lift the seat from the wheelchair and deposit the seat and the disabled person seated therein upon the seat of the vehicle. The actuator is movable relative to the door in a longitudinal, transverse, or vertical direction.

11 Claims, 5 Drawing Figures

Fig-1
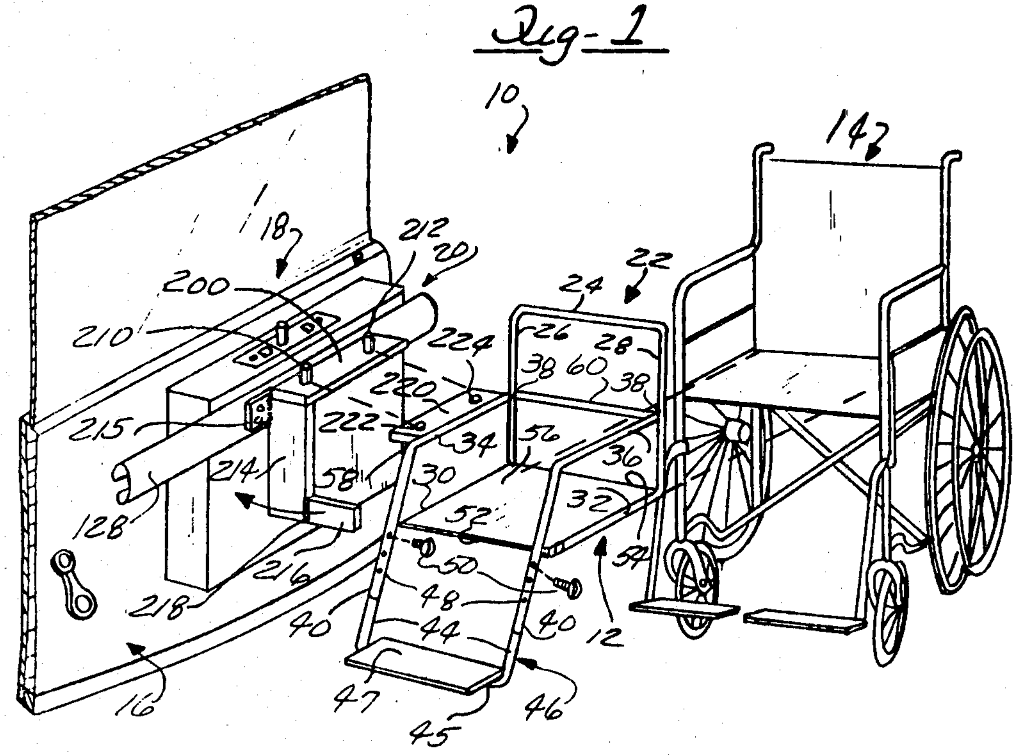
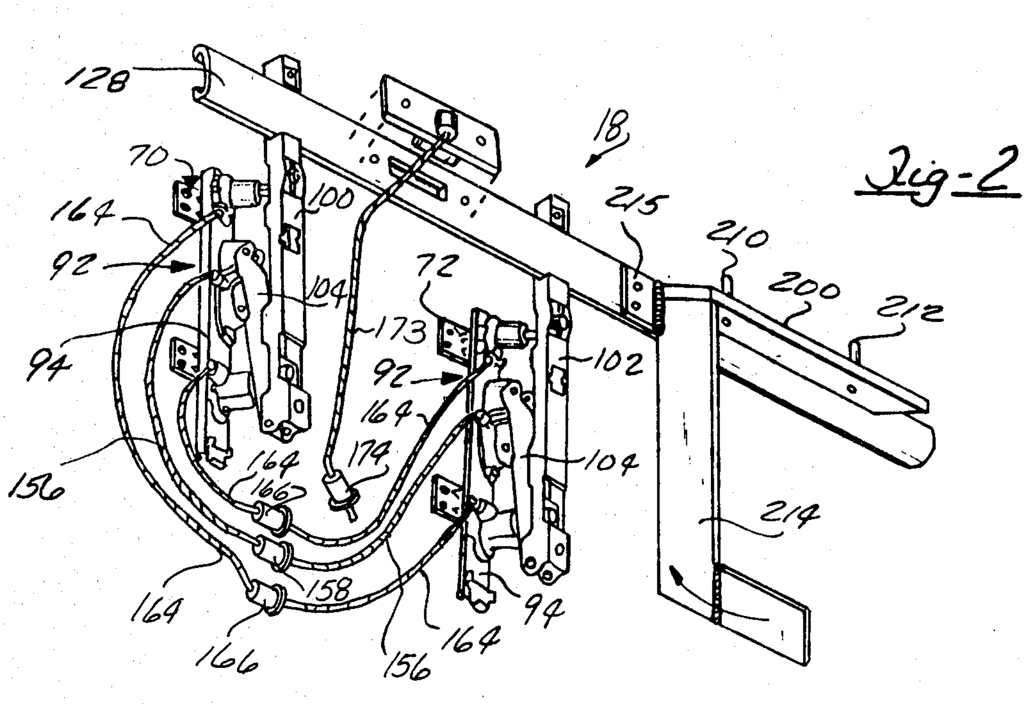
Fig-2

DISABLED PERSON TRANSFER DEVICE

BACKGROUND OF THE INVENTION

I. Field of the Invention

This invention relates to the field of handicapped or disabled person transfer devices. More particularly, the present invention relates to the field of transferring handicapped persons from a wheelchair into a vehicle. Even more particularly the present invention relates to the field of transfer devices for transferring handicapped persons from a wheelchair into a vehicle, the transfer device requiring a minimum of modification of the vehicle to be applied.

II. Prior Art

Lift devices for transferring handicapped persons into vehicles are known. Generally, vans or passenger vehicles with a special front seat arrangement are used. In any event, extensive modification to the vehicle is required to employ the known transfer devices. The known devices comprise a hoist attached to the roof of the vehicle, hydraulically or electrically movable platforms, and a specially designed wheelchair that may occupy space created by the removal of the front seat of a vehicle.

All of the known devices require extensive and expensive modification of a vehicle for their effective use. The present invention is adapted to be attached to the front door of a vehicle and requires only a few minutes time to be attached. The device of the present invention can also be transferred from one vehicle to another with a minimum of cost and inconvenience.

SUMMARY OF THE INVENTION

The present invention comprises a device for transferring a person from a wheelchair to a vehicle and includes a removable seat adapted to be placed upon the seat of a wheelchair. An actuator attached to the door of the vehicle is designed to releasably engage the seat, lifting the seat from the wheelchair and transferring the seat and occupant of the seat onto the front seat of a vehicle. The actuator is able to move the seat relative to the door in a longitudinal transverse, or vertical direction.

The actuator is a compact one-piece device which is readily bolted to the door of the vehicle requiring only a few minutes time.

In a preferred embodiment the actuator is electrically operated and uses components readily available from electrically operated vehicle seat actuators.

It is therefore an object of the present invention to provide a new and improved device for transferring handicapped persons from a wheelchair to a vehicle.

It is also an object of the present invention to provide a new and improved device for transferring handicapped persons from a wheelchair to a vehicle that is compact, inexpensive and adaptable to any standard size vehicle.

It is a further object of the present invention to provide a device for transferring handicapped persons from a wheelchair to a vehicle that is made primarily from a number of standard commercially available components.

It is a further object of the present invention to provide a new and improved device for transferring handicapped persons from a wheelchair to a vehicle that may be readily transferred from one vehicle to another vehicle in a short period of time requiring a minimum amount of expense.

Other objects, advantages, and applications of the present invention will become apparent to those skilled in the art of transfer devices for the handicapped when the accompanying description of one example of the best modes contemplated for practicing the invention is read in conjunction with the accompanying drawing.

BRIEF DESCRIPTION OF THE DRAWING

The description herein makes reference to the accompanying drawing wherein like reference numbers refers to like parts throughout the several views and wherein:

FIG. 1 is a broken perspective view of a door of an automotive vehicle incorporating the handicapped person transfer device of the present invention;

FIG. 2 illustrates a perspective view of the actuator of the present invention;

DESCRIPTION OF THE PREFERRED EMBODIMENTS

Figure 3:
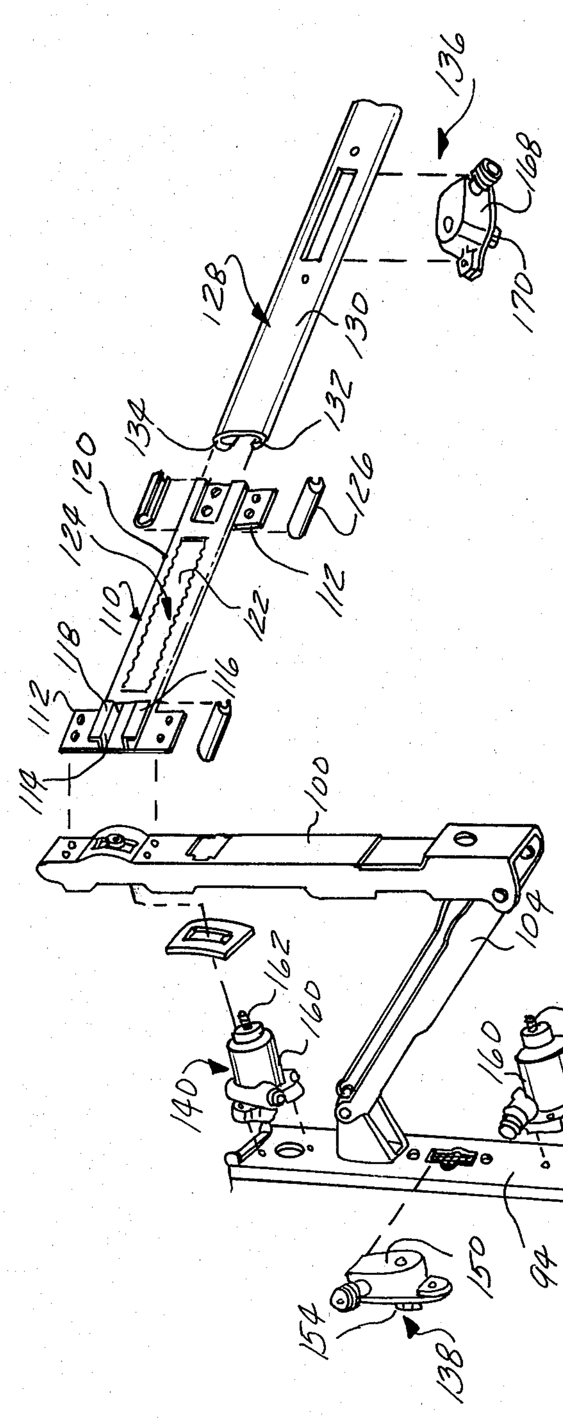
FIG. 3 illustrates a broken exploded perspective view of the actuator of the present invention.

Referring now to the drawing, and in particular to FIG. 1 wherein there is illustrated at 10 a preferred embodiment of the present invention in the form of a device for transferring a handicapped person from a wheelchair to a vehicle. The device 10 is adapted to provide a removable seat 12 associated with a conventional wheelchair 14. The removable seat 12 is sized to rest upon the seat of the wheelchair 14 and be readily removable therefrom. A door 16 of the vehicle supports an actuator 18 which has a means 20 for releasably engaging the seat 12. The actuator 18 is movable relative to the door in a longitudinal, transverse, or vertical direction.

The removable seat 12 comprises a back and seat member 22 formed from tubing and comprising a horizontal top piece 24 which curves downward at the outer corners thereof to form a pair of upright side members 26,28. The side members 26,28 curve forward at a lower end thereof to form a pair of seat side members 30,32. A pair of arm rests 34,36 are spaced above and parallel to the seat side members 30,32 and include a rear end 38 fixedly attached to the upright side members 26,28. A forward end of the arm rests 34,36 curves downward to extend downward and outward to form an adjustable foot rest upper portion 40. An adjustable foot rest 46 includes a pair of spaced apart telescoping members 44 telescopingly engageable with the foot rest upper portion 40, and a foot rest 47 which extends between a lower end 45 of the spaced apart telescoping members 44 and is fixedly attached thereto. A plurality of spaced apart apertures 48 are formed along a lower end of the foot rest upper portion 40, and an aperture (not shown) formed in an upper end of the spaced telescoping members 44 is positioned to selectively align with one of the plurality of spaced apertures 48. A pair of pins 50 are configured to engage the selectively aligned apertures and adjustably engage the telescoping members with the foot rest upper portion to define an adjustable foot rest. A pair of transverse seat members 52,54 extend between a forward end of the seat side members 30,32 and the intersection of the upright side members 26,28 and the rear ends 38 of the seat side members 30,32. A planar seat 56 is supported by the seat side members 30,32 and the transverse members 52,54 and is affixed thereto. A reinforcing bar 58 extends along the arm rest 34 and is fixedly attached thereto. The bar 58 extends longitudinally along the arm rest 34 then transversely across the back of the seat 12 to form a transverse bar 60 affixed to the upright side members 26,28.

As shown in FIGS. 2 and 3 the actuator 18 comprises a pair of vertical spaced apart tracks 70,72 affixed to the vehicle door 16. Each track 70,72 includes a bottom wall 74 adjacent the door, a pair of opposed walls 76,78 integral with and extending vertically from the bottom 74, and a pair of opposed outward extending flanges 80,82 integral with the opposed walls 76,78. An upper wall 84 extends between the flanges 80, 82 and includes a longitudinal opening 86 formed along the upper wall 84 with gear teeth 85 formed along a longitudinal edge thereof to define a rack 88. A plurality of pads 90 are provided having longitudinal slots formed therein which are engageable with the outward extending flanges 80,82 and form a linear bearing surface to support a pair of vertically movable members 92.

The pair of vertically movable members 92 are configured to be vertically movable along each track 70,72 and include an outer wall 94 spaced from and parallel to the bottom wall 74, and a pair of arcuate side walls 96,98 integral with the outer wall 94 and curving toward the track 70,72 and inward to encircle the plurality of pads 90 with the vertically movable members 92 being slidingly associated with the pads. A pair of transversely movable members 100,102 are disposed parallel to each vertically movable member 92 and are pivoted thereto to be vertically movable therewith.

Each transversely movable member 100,102 is supported by an arm 104 interconnecting each transversely movable member and an associated vertically movable member. The arm 104 is hinged at a lower end to the vertically movable member 94 and hinged at an upper end to the transversely movable member 100,102.

A horizontal track 110 extends between and is fixedly attached to the transversely movable members 100, 102. The horizontal track 110 includes a horizontal bottom wall 112 supported by the transversely movable members. The horizontal track 110 includes a pair of upright walls 114 integral with the horizontal bottom wall 112, a pair of opposed horizontal flanges 116,118 integral with the upright walls, and an outside wall 120 extending between flanges 116,118. A horizontal opening 122 formed along the outside wall 120 includes gear teeth formed along an edge thereof to define a horizontal rack 124. A plurality of horizontal pads 126 are engageable with the opposed horizontal flanges 116,118 to provide a low friction bearing for a horizontally movable member 128. The horizontally movable member 128 is slidingly movable along the horizontal track and includes a horizontal wall 130 spaced from and parallel to the horizontal bottom wall 112, and a pair of opposed arcuate horizontal end walls 132,134 integral with the horizontal wall and curving toward the horizontal bottom wall 130 and inward to embrace the horizontal pads 126, with the horizontally movable member 128 being slidingly movable along the horizontal pads 126.

The actuator 18 includes means 136 for moving the horizontally movable member 128 horizontally relative to the door, means 138 for moving the horizontally movable member vertically relative to the door 16, and means 140 for moving the horizontally movable member transversely relative to the vehicle door 16.

In a preferred embodiment the means 136,138 and 140 for moving the actuator 18 relative to the door comprise electro mechanical actuators powered by the vehicle battery which are readily available as a front seat actuator for passenger vehicles.

As can best be seen in FIGS. 2 and 3, the means 138 for moving the horizontally movable member vertically comprises a flexible shaft driven reducing gear 150 having an output shaft (not shown) and a gear 154 affixed to the output shaft of each reducer 150. The gears 154 are engageable with the rack 88 of each vertical track 70, 72. Flexible shafts 156 are driven by a first reversible electric motor 158. The first electric motor 158 is selectively coupled to an electrical power source (not shown) by means of a first three position switch (not shown) and wherein; when the first three way switch is in a first position the first electric motor is in a stopped condition. In a second position the electric motor 158 causes the gears 154 engaging the racks 88 to raise the horizontally movable member 128, and in a third position the first electric motor 158 causes the gears 154 engaging the racks 88 to lower the horizontally movable member 128.

The means 140 for moving the horizontally movable member 128 transversely comprises two pair of flexible shaft driven linear actuators 160 including a linearly movable output shaft 162. Each pair of linear actuators 160 is disposed between each vertically movable member 92 and its associated transversely movable member 110, 102 with the actuators 160 adapted to transversely position the transversely movable members 100, 102 in response to rotation of a flexible shaft 164. The flexible shafts 164 of the linear actuators 160 are rotatingly driven by a second reversible motor 166. The second reversible motor 166 is selectively coupled to an electrical power source by means of a second three way position switch (not shown). When the second three way switch is in a first position the second electric motor 166 is stopped, in a second position the second electric motor 166 causes the linear actuators 160 to move the horizontally movable member 128 laterally outward, and in a third position the second electric motor 166 causes the linear actuators 160 to move the horizontally movable member 128 laterally inward.

The means 136 for moving the horizontally movable member 128 horizontally comprises: a second flexible shaft driven gear reducer 168 having a second output shaft (not shown) with a second gear 170 affixed to the shaft. The second gear 170 is engageable with the second rack 124 to move the horizontal member 128 in a horizontal direction. A second flexible shaft 173 drives the second flexible shaft driven gear reducer 168, with the second flexible shaft driven by a third reversible electric motor 174. The third electric motor 174 is selectively coupled to an electrical power source (not shown) by means of a third three way switch (not shown). When the third three way switch is in a first position the third electric motor 174 is stopped, in a second position the third electric motor 174 causes the second gear 168 to move the horizontally movable member 128 in a first horizontal direction, and when the third three way switch is in a third position the third electric motor 174 causes the second gear 168 to move the horizontally movable member 128 in a second horizontal direction.

Figure 5:
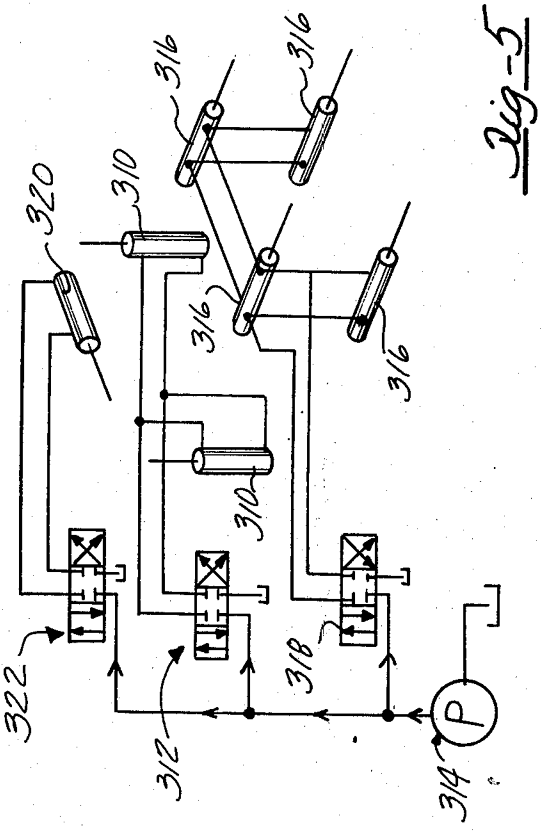
FIG. 5 illustrates a circuit diagram of the device of FIG. 4.
Figure 4:
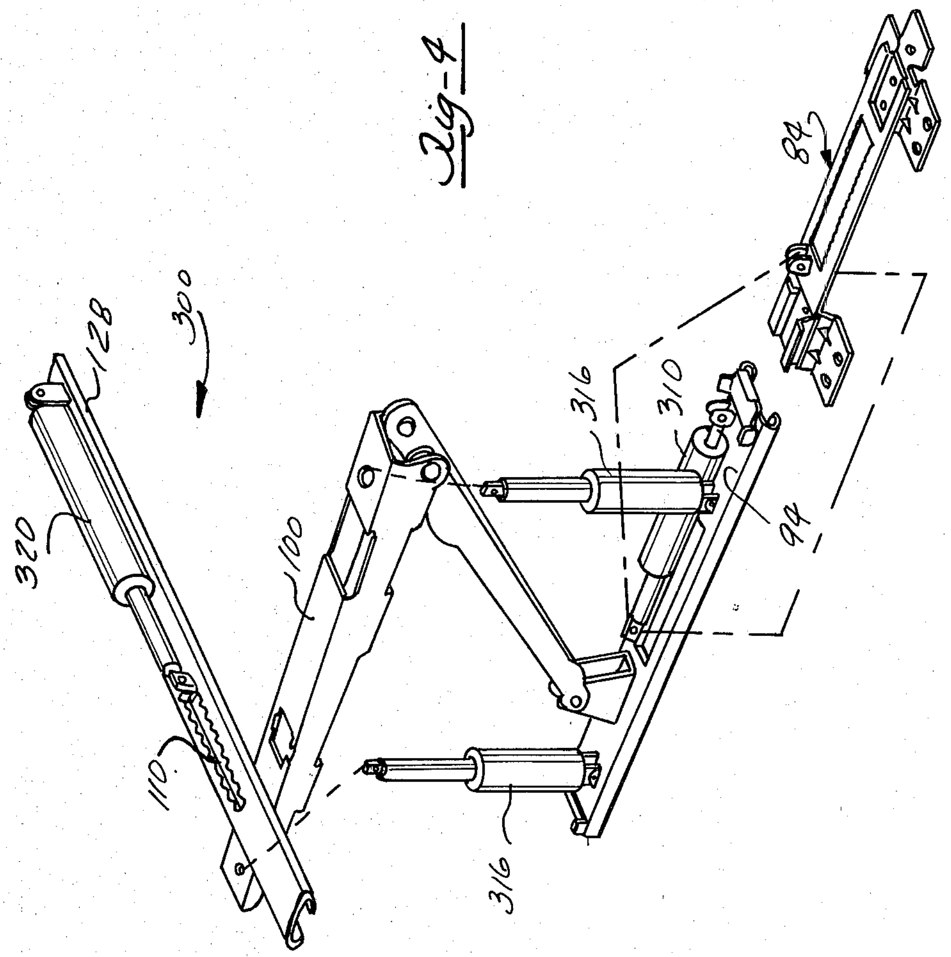
FIG. 4 illustrates a broken perspective view of the actuator of the present invention employing fluid actuators.

The actuator 18 may alternately be moved in a horizontal, vertical, or transverse direction by means of linear fluid actuators. A linear fluid actuator actuated means 300 is illustrated in FIGS. 4 and 5. The fluid actuated means 300 for moving the horizontally movable member 128 in a vertical direction comprises a first pair of fluid actuated linear cylinders 310 with each cylinder pivotally attached at a cylinder end to one of the vertically movable members 92, with a rod end of each first cylinder pivotally attached to an associated vertical track 84. A first three position four way valve 312 (FIG. 5) is connected to a fluid power source such as a pump 314 and is interconnected to the cylinders 310 in parallel. When the first four way valve 312 is in a first position the cylinders 310 are blocked against movement, in a second position the horizontally movable member 128 is moved up vertically by the cylinders 310, and in a third position the horizontally movable member 128 is moved vertically downward by the cylinders 310.

The fluid actuator device 300 is movable in a transverse direction by a second and a third pair of fluid actuated linear cylinders 316 which are pivotally affixed at a cylinder end to one of the vertically movable members 92 in a spaced apart manner and pivotally affixed at a rod end to an associated transversely movable member 100 or 102. A second three position four way valve 318 is connected to the fluid power source 314 and is interconnected to the cylinders 316. With the second four way valve in a first position the cylinders 316 are blocked against movement, with the second four way valve 318 in a second position the cylinders 316 move the horizontally movable member 128 transversely outward, and with the second four way valve in a third position the cylinders 316 move the horizontally movable member 128 transversely inward.

The means for moving the horizontally movable member 128 in a horizontal direction by means of a fluid actuated linear cylinder comprises: a fluid actuated linear cylinder 320 pivotally attached at a rod end to the horizontal track 110 and pivotally attached at a cylinder end to the horizontally movable member 128. A third three position four way valve 322 is connected to the fluid power source 314 and interconnected to the cylinder. With the third three position four way valve in a first position the horizontally movable member 128 is blocked against movement, in a second position the horizontally movable member 128 is moved horizontally in a first direction, and with the valve 322 in a third position the horizontally movable member 128 is movable horizontally in a second direction.

The means 20 for releasably engaging the seat 12 with the actuator 18 comprises: a seat engaging bar 200 hinged to the horizontally movable member 128, as shown in FIG. 1. A pair of spaced apart upward projecting pins 210,212 are affixed to an upper surface of the seat engaging bar 200 with a downward projecting leg 214 integral with the bar and secured to a hinge 215 at an upper end of the leg. A folding seat stabilizer bar 216 projects transversely from a lower edge of the leg 214 to releasably engage the seat side member 30. The stabilizer 216 is hinged to the leg 214 by a hinge 218 which allows the stabilizer to be folded against the vehicle door 16 when not in use. A lifter bar 220 is attached to the reinforcing bar 58 and extends longitudinally therealong and transversely outward from the chair. A pair of spaced apertures 222,224 are formed through the lifter bar 220 and are configured to be aligned and slidingly engageable with the spaced apart upward projecting pins 210, 212. To transfer a handicapped person from a wheelchair 14 to a vehicle, the removable seat 12 is placed in the wheelchair 14 and the handicapped person is seated in the removable seat 12. The wheelchair 14 is moved to a position adjacent the open door 16 of the vehicle. The actuator 18 is then manipulated to place the pins 210,212 in line with the apertures 222,224, and the actuator 18 is then raised engaging the pins with the aligned apertures. The folding seat stabilizer 216 is deployed to engage the seat side member 30 and the removable seat 12 is lifted by the actuator 18 from the wheelchair 14. The removable seat 12 with the handicapped person seated thereon is then manipulated by the actuator 18 to a position where the door 16 can be closed and the chair 12 is positioned above the seat of the vehicle. The seat 12 is then lowered to rest upon the seat of the vehicle.

It is apparent to the skilled artisan that the actuator 18 may be also manipulated by hand employing lead screws threadingly engaging a movable nut to translate the horizontally movable member 128 in a horizontal, vertical, or transverse direction.

It can thus be seen that the present invention has provided a new and improved device for transferring handicapped persons from a wheelchair to a vehicle wherein a removable seat and an actuator attached to a door of a vehicle are employed to effect the transfer. The device of the present invention may be readily adapted to any standard vehicle such as passenger cars or vans with a minimum of effort and expense. The device of the present invention may also be conveniently moved from one vehicle to another with a minimum of expense.

It should be understood by those skilled in the art to which this invention pertains that other forms of the Applicant's invention may be had, all coming within the spirit of the invention and the scope of the appended claims.

Having thus described my invention what I claim is:

1. A device for transferring a person from a wheelchair to a vehicle having a door comprising:

a removable seat associated with the wheelchair;

an actuator adapted to be attached to the vehicle door; and means for releasably engaging the seat with the actuator;

the actuator being movable relative to the door to move the seat into or out of the vehicle, the actuator comprising:

a pair of vertically-extending spaced tracks adapted to be mounted on the vehicle door;

a pair of vertically movable members slidingly engaging the vertically extending tracks and vertically movable therealong;

a pair of transversely movable members disposed parallel to each vertically movable member and vertically movable therewith;

an arm interconnecting each transversely movable member and an associated vertically movable member, each arm being hinged at opposed ends to the vertically movable member and the transversely movable member, respectively;

a horizontal track extending between and fixedly attached to the transversely movable members;

a horizontally movable member slidingly engaging and movable along the horizontal track; and means for moving the horizontally movable member in a horizontal, vertical and transverse direction relative to the vehicle door.

2. The device as defined in claim 1 wherein the means for releasably engaging the seat with the actuator comprises:

a seat engaging bar associated with the actuator including an upward projecting pin; and a lifter bar attached to the seat including an aperture formed therein to slidingly engage the upward projecting pin.

3. A device for transferring a person from a wheelchair to a vehicle having a door comprising:

a removable seat associated with the wheelchair, the removable seat comprising:

(a) a back and seat member formed from tubing including a horizontal top piece curving downward at outer corners thereof to form a pair of upright side members, the side members curving forward at a lower end thereof to form a pair of seat side members;

(b) a pair of arm rests spaced above and parallel to the seat side members including a rear end attached to the upright side members, a forward end of the arm rests curving downward and forward forming upper support portions;

(c) a pair of spaced apart members telescopingly engageable with the upper support portions;

(d) a foot rest extending between a lower end of the spaced apart telescoping members and fixedly attached thereto;

(e) a plurality of spaced apart apertures formed along a lower end of the upper support portions;

(f) an aperture formed in an upper end of the spaced telescoping members positioned to selectively align with one of the plurality of spaced apart apertures;

(g) a pair of pins engaging the selectively aligned apertures to adjustably engage the telescoping members;

(h) a pair of transverse seat members extending between a forward end of the seat side member and between the intersection of the upright side members and the seat side members;

(i) a planar seat supported by the seat side members and transverse members; and (j) a reinforcing bar extending along an arm rest and fixedly attached thereto, the bar extending longitudinally along the arm rest then transversely across a back of the seat to form a transverse bar affixed to the upright side members;

an actuator attached to the door of the vehicle; and means for releasably engaging the seat with the actuator;

the actuator being movable relative to the door to move the seat into or out of the vehicle.

4. A device for transferring a person from a wheelchair to a vehicle having a door comprising:

a removable seat associated with the wheelchair;

an actuator attached to the door of the vehicle; and means for releasably engaging the seat with the actuator;

the actuator being movable relative to the door to move the seat into or out of the vehicle, the actuator comprising:

(a) a pair of vertically extending, spaced apart tracks affixed to the vehicle door, each track including a bottom wall adjacent the door, a pair of opposed walls integral with and extending vertically from the bottom wall and a pair of opposed outward extending flanges integral with the opposed walls, an upper wall extending between the flanges, a longitudinal opening formed along the upper wall with gear teeth formed along a longitudinal edge thereof defining a rack;

(b) a plurality of pads engageable with the outward extending flanges;

(c) a pair of vertically movable members associated with each track and including an outer wall spaced from and parallel to the bottom wall, a pair of opposed arcuate side walls integral with the outer wall and curving toward the track and inward to encircle the pads, the vertically movable member being movable along the pads;

(d) a pair of transversely movable members disposed parallel to each vertically movable member and vertically movable therewith;

(e) an arm interconnecting each transversely movable member and an associated vertically movable member, the arm hinged to the vertically movable member at an upper end and hinged to the transversely movable member at a lower end;

(f) a horizontal track extending between and fixedly attached to the transversely movable members, the horizontal track including a horizontal bottom wall supported by the transversely movable members, a pair of upright walls integral with the horizontal bottom wall, a pair of opposed horizontal flanges integral with the upright walls, and an outside wall extending between the flanges with a horizontal opening formed therealong and including gear teeth formed along an edge thereof to define a horizontal rack;

(g) a plurality of horizontal pads engageable with the opposed horizontal flanges of the horizontal track;

(h) a horizontally movable member slidingly movable along the horizontal track and including a horizontal wall spaced from and parallel to the horizontal bottom wall, a pair of opposed arcuate horizontal end walls integral with the horizontal wall and curving toward the horizontal bottom wall and inward to embrace the horizontal pads, the horizontally movable member being movable along the horizontal pads; and (i) means for moving the horizontally movable member in a horizontal, vertical, and transverse direction relative to the door.

5. The device as defined in claim 4 wherein the means for moving the horizontally movable member in a vertical direction comprises:

a pair of flexible shaft driven gear reducers, each including an output shaft;

a gear affixed to the output shaft of each reducer;

the gears being engageable with the rack of each vertical track;

a first reversible electric motor driving the flexible shafts;

a first three-position switch selectively coupling the first electric motor to an electrical power source; and wherein when the first three-position switch is in a first position the first electric motor is in a stopped condition, when the first three-position switch is in a second position the first electric motor causes the gears engaging the racks to raise the horizontally movable member, and when the first three-position switch is in a third position the first electric motor causes the gears engaging the racks to lower the horizontally movable member.

6. The device as defined in claim 4 wherein the means for moving the horizontally movable member in a transverse direction comprises:

two pair of flexible shaft driven linear actuators having a flexible shaft input shaft and a linearly movable output shaft, a pair of the linear actuators being disposed between each vertically movable member and its associated transversely movable member and adapted to transversely position the transversely movable members in response to rotation of a flexible shaft;

a second reversible electric motor rotatably driving the flexible shafts of the linear actuators;

a second three-position switch selectively coupling the second reversible motor to an electrical power source; and wherein when the second three-position switch is in a first position the second electric motor is stopped, in a second position the second electric motor causes the linear actuators to move the horizontally movable member laterally outward, and in a third position the second electric motor causes the linear actuators to move the horizontally movable member laterally inward.

7. The device as defined in claim 4 wherein the means for moving horizontally movable member in a horizontal direction comprises:

a second flexible shaft driven gear reducer including a second output shaft with a second gear affixed thereto;

the second gear being engageable with the horizontal rack;

a third reversible electric motor driving the second flexible shaft;

a third three-position switch selectively coupling the third reversible electric motor to an electrical power source; and wherein when the third three-position switch is in a first position the third electric motor is stopped, when the third three-position switch is in a second position the third electric motor causes the second gear to move the horizontally movable member in a first horizontal direction, and when the third three-position switch is in a third position the third electric motor causes the second gear to move the horizontally movable member in a second horizontal direction.

8. The device as defined in claim 4 wherein the means for moving the horizontally movable member in a vertical direction comprises:

a first pair of fluid actuated linear cylinders with each cylinder being pivotally attached at a cylinder end to one of the vertically movable members and a rod end of each cylinder being pivotally attached to an associated vertical track;

a first three position four-way valve connected to a fluid power source and interconnected to the cylinders in parallel; and wherein with the first four-way valve in a first position the cylinders are blocked against movement, with the first four-way valve in a second position the horizontally movable member is moved vertically upward, and with the first four-way valve in a third position the horizontally movable member is moved vertically downward.

9. The device as defined in claim 4 wherein the means for moving the horizontally movable member in a transverse direction comprises:

a second and a third pair of fluid actuated linear cylinders with each pair of cylinders pivotally affixed at a cylinder end to one of the vertically movable members in a spaced apart manner and pivotally affixed at a rod end to an associated transversely movable member;

a second three-position four-way valve connected to a fluid power source and interconnected to the second and third pair of cylinders; and wherein with the second three-position four-way valve is in a first position the cylinders are blocked against movement, with the second four-way valve in a second position the cylinders move the horizontally movable member transversely outward and with the second four-way valve in a third position the cylinders move the horizontally movable member transversely inward.

10. The device as defined in claim 4 wherein the means for moving the horizontally movable member in a horizontal direction comprises:

a fluid actuated linear cylinder pivotally attached at a rod end to the horizontal tracks and pivotally attached at a cylinder end to the horizontally movable member;

a third three-position four-way valve connected to a fluid power source and interconnected to the cylinder; and wherein with the three-position four-way valve in a first position the horizontally movable member is blocked against movement, with the third four-way valve in a second position the horizontally movable member is moved horizontally in a first direction, and with the third four-way valve in a third position the horizontally movable member is moved horizontally in a second direction.

11. The device as defined in claim 4 wherein the means for releasably engaging the seat with the actuator comprises:

a seat engaging bar hinged to the horizontally movable member, a pair of spaced apart upward projecting pins attached to an upper surface of the seat engaging bar, a downward projecting leg integral with the seat engaging bar, a folding seat stabilizer projecting transversely from the leg to engage the seat side member, the stabilizer being hinged to the leg and foldable toward the door;

a lifter bar attached to the reinforcing bar, a pair of spaced apertures formed in the lifter bar aligned and slidingly engageable with the spaced apart upward projecting pins; and wherein when the upward projecting pins engage the spaced apertures and the seat stabilizer engages the seat side member the seat may be lifted and moved into the vehicle.

* * * * *